(12) United States Patent
Haney et al.

(10) Patent No.: US 12,259,740 B2
(45) Date of Patent: Mar. 25, 2025

(54) METHODS AND SYSTEMS FOR PRECISION DOSING OF FLUID SYSTEMS

(71) Applicant: DETECHTION USA INC., Houston, TX (US)

(72) Inventors: Virgil Haney, Houston, TX (US); Christian Montes, Houston, TX (US)

(73) Assignee: DETECHTION USA INC., Houston, TX (US)

( * ) Notice: Subject to any disclaimer, the term of this patent is extended or adjusted under 35 U.S.C. 154(b) by 245 days.

(21) Appl. No.: 17/837,279

(22) Filed: Jun. 10, 2022

(65) Prior Publication Data

US 2022/0397920 A1 Dec. 15, 2022

Related U.S. Application Data

(60) Provisional application No. 63/209,262, filed on Jun. 10, 2021.

(51) Int. Cl.
G05D 9/12 (2006.01)
(52) U.S. Cl.
CPC .................. G05D 9/12 (2013.01)
(58) Field of Classification Search
CPC ...................................................... G05D 9/12
See application file for complete search history.

(56) References Cited

U.S. PATENT DOCUMENTS

| | | | |
|---|---|---|---|
| 5,634,522 A | 6/1997 | Hershberger | |
| 7,878,250 B2 | 2/2011 | Sheldon | |
| 9,476,743 B1 | 10/2016 | Westmoreland et al. | |
| 10,472,255 B2 | 11/2019 | Black et al. | |
| 2013/0153231 A1* | 6/2013 | Ayres | G05D 7/0635 166/305.1 |
| 2018/0340114 A1* | 11/2018 | Fouchard | C09K 8/54 |
| 2019/0242204 A1 | 8/2019 | Skaugen et al. | |

FOREIGN PATENT DOCUMENTS

CN 106945954 A 7/2017

* cited by examiner

*Primary Examiner* — Jason K Niesz
(74) *Attorney, Agent, or Firm* — Husch Blackwell LLP

(57) ABSTRACT

A method and system to precision dose a fluid system with an injection fluid having chemicals is provided. The method and system includes providing a buffered dosing tank of a known geometry between a source tank and an injection pump. The fluid level detector measures the pressure of the dosing tank to determine a fluid level. The fluid level together with the known geometry allow for a controller to calculate a fluid volume in the dosing tank and a change of volume over time. Using the change of volume over time, the controller can calculate an actual dose rate and adjust a speed or duty cycle of the injection pump such that the actual dose rate is approximately the target dose rate.

7 Claims, 3 Drawing Sheets

| |
|---|
| Determine the fluid level of the reservoir tank - 202 |
| Is the fluid level below a minimum level - 204 |
| Return to step 202 if the fluid level is not below the minimum level |
| If the fluid level is below the minimum level, the controller closes the pump isolation valve and opens the source tank isolation valve to fill the reservoir tank - 206 |
| Monitor the fluid level of the reservoir tank - 208 |
| Determine the fluid level of the reservoir tank - 210 |
| If the fluid level is below a predetermined fill level, return to step 208 |
| If the fluid level is equal to the predetermined fill level, the controller closes the source tank isolation valve and opens the pump isolation valve - step 212 |

Figure 2

| Set the injection pump to operate at a first speed - step 302 |
|---|
| Determine the volume of the reservoir tank - step 304 |
| Start the injection pump at the first speed - step 306 |
| Stop the injection pump - step 308 |
| Determine the pressure on the pressure sensor and determine the volume - step 310 |
| Determine the change in volume over time of the reservoir tank - step 312 |
| Based on the change in volume over time, determine the actual dose rate - step 314 |
| If the actual dose rate equals (within a tolerance) the target dose rate, maintain the first speed - step 316 |
| If the actual dose rate is greater than (within a tolerance) the target dose rate, change the speed of the injection pump to a second speed, slower than the first speed - step 318 |
| If the actual dose rate is less than (within a tolerance) the target dose rate, change the speed of the injection pump to a third speed, faster than the first speed - step 320 |
| Restart the injection pump - step 322 |

Figure 3

METHODS AND SYSTEMS FOR PRECISION DOSING OF FLUID SYSTEMS

CROSS-REFERENCE TO RELATED PATENT APPLICATIONS

This application claims the benefit of and priority to U.S. Provisional Application No. 63/209,262, filed Jun. 10, 2021, titled "METHODS AND SYSTEMS FOR PRECISION DOSING OF FLUID SYSTEMS", the disclosure of which is incorporated herein in its entirety.

BACKGROUND

Hydrocarbon production generally involves a well or wellbore. The wellbore may be lined with a casing to allow equipment to be lowered into the wellbore to a downhole position. The equipment may be drilling equipment, pumping equipment, or the like as is generally known in the art.

The apparatuses, fluids, and introduced chemicals to the wellbore make the operating environment particularly harsh and corrosive. The well owner may introduce chemicals into the wellbore to facilitate operation, reduce corrosion, or clean the downhole devices and fluids. In some cases, trucks (generally known as treater trucks) with chemicals may be coupled to the drill string such that chemicals may be pumped directly from truck holding tanks to the wellbore. While effective, using trucks is sometimes problematic as it can be difficult to get the trucks to some remote locations. Additionally, the chemicals pumped into the wellbore, such as, for example, a foaming agent or corrosion inhibitor, may be overloaded by a batch treatment to make sure the treatment lasts until the next time the truck may be established at the pump house.

To combat the overtreatment and other inefficiencies of treater trucks, many well sites include an onsite chemical tank distribution system. The chemical tank distribution system generally has a chemical tank coupled to a discharge manifold. The chemical tank generally has a defined fluid volume with a known amount of a chemical contained in the fluid volume. A pump located downstream of the discharge manifold periodically injects a defined amount of the chemical to a downhole distribution point.

To ensure a proper amount of chemical is delivered per unit of time, the processor that controls the injection requires, among other things, knowledge of the amount of fluid that has been discharged. The amount of fluid discharged can be monitored by a number of different mechanisms. The amount of fluid discharge by a pump may be determined by the number of strokes of the pump. The amount of fluid discharged by a pump may be determined by a flow meter. The amount of fluid discharged by a pump may be determined by a change in volume of a chemical source tank over time.

Each of the above methods has drawbacks. Measuring discharge based on pump strokes is subject to numerous variables that make determining the actual amount of discharge, and hence chemical injection, inaccurate. Using flow meters for the relatively low volumes and flow rates associated with chemical injection is expensive. The chemical source tanks have non-standard, or uncommon, shapes making the discharge amount difficult to determine by mathematical conversions. Because of the uncommon shapes, the transition between fluid level and volume is typically determined by tabulation, commonly referred to as Strap Tables, that are often not sufficiently accurate to measure the fluid discharged by the pump.

Thus, against the above background, it would be desirous to provide an improved methods and systems for precision dosing fluid systems.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a method and system to precision dose a fluid system with an injection fluid having chemicals is provided. The method and system includes providing a buffered dosing tank of a known geometry between a source tank and an injection pump. The fluid level detector measures the pressure of the dosing tank to determine a fluid level. The fluid level together with the known geometry allow for a controller to calculate a fluid volume in the dosing tank and a change of volume over time. Using the change of volume over time, the controller can calculate an actual dose rate and adjust the speed/duty cycle of the injection pump such that the actual dose rate is approximately the target dose rate.

In some embodiments, the fluid level detector is a pressure sensor. In other embodiments, the fluid level detector is a radio frequency sensor, an ultrasonic sensor, a plurality of reed switches, or a combination thereof. In certain aspects, the dosing tank is cylindrical in shape. In other aspects, the dosing tank is rectangular or another known geometry where fluid level is correlated to fluid volume without the need for interpolation/extrapolation or other means of estimating volume from fluid level.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 2 shows a flow chart illustrative of methods associated with the technology of the present application.

FIG. 3 shows a flow chart illustrative of methods associated with the technology of the present application.

DETAILED DESCRIPTION

Figure 1:
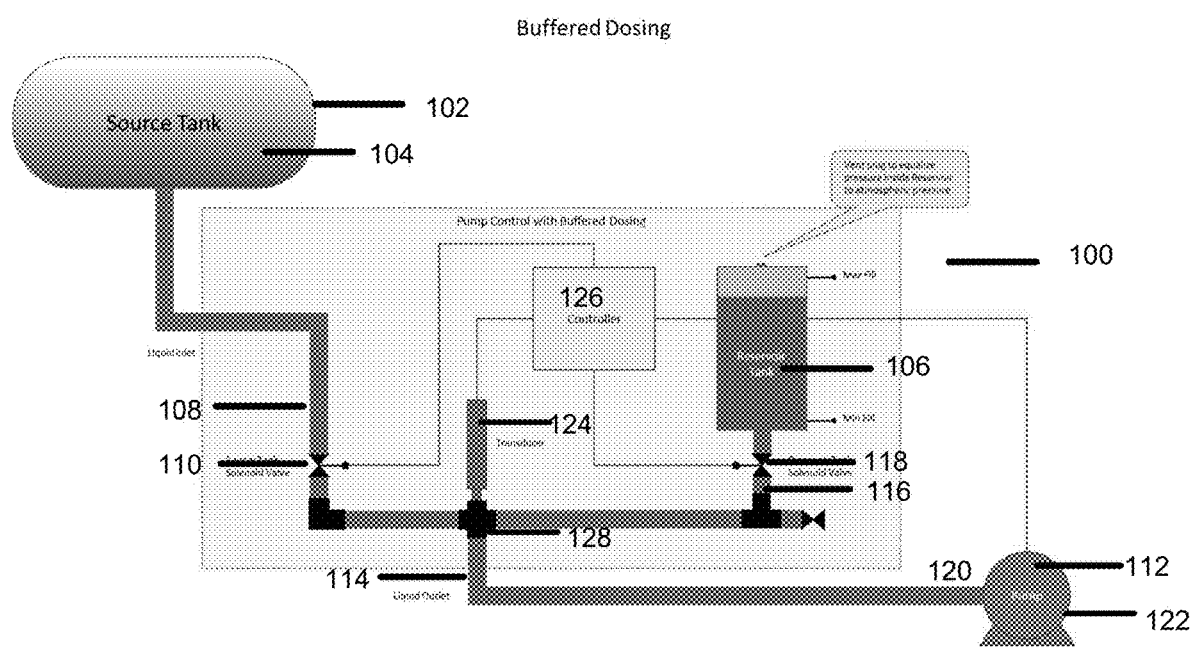
FIG. 1 shows a system schematic diagram consistent with the technology of the present application.

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to wellbores used in hydrocarbon pumping. However, the technology described herein may be used with applications other than those specifically described herein. For example, the technology of the present application may be applicable to lubrication systems, fluid transport systems, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

With reference now to FIG. 1, a system 100 to achieve precision dosing of chemicals to a fluid system consistent with the technology of the present application is provided. The system 100 includes, among other things, a chemical source tank 102. The chemical source tank 102 contains a chemical injection fluid 104. The chemical injection fluid has a known volumetric mixture of chemicals, such as 10 grams chemical X/liter of fluid, as a simple example thereof. The chemical source tank 102 is selectively in fluid communication with a dosing tank 106. As will be explained further below, the dosing tank 106 has a known geometry. Preferably, the geometry of the dosing tank 106 is such that a small volumetric change of injection fluid in the dosing tank is directly correlated to a large fluid level change. In certain embodiments, the dosing tank may be cylindrical, rectangular, or the like.

The chemical source tank 102 and the dosing tank 106 are selectively in fluid communication via a pipe 108 (or other conduit 108) that has a tank isolation valve 110. Opening and closing the tank isolation valve 110 places (or removes) the chemical source tank 102 and dosing tank 106 in (from) fluid communication. Typically, the chemical source tank 102 is at atmospheric pressure. Placing the dosing tank 106 at an elevation below the chemical source tank 102 will allow the chemical source tank 102 to fill the dosing tank 106 using gravity, in which case the dosing tank 106 should be vented or also at a similar pressure. Optionally, however, a second pump may be placed in pipe 108 such that operation of the pump (which will generally be referred to as a fill pump) would transfer chemical injection fluid 104 from the chemical source tank 102 to the dosing tank 106.

As shown, the pipe 108 selectively places the chemical source tank 102 and the dosing tank 106 in fluid communication. When the dosing tank 106 is not being filled, however, the tank isolation valve 108 may be closed to isolate the chemical source tank 102 from the dosing tank 106.

An injection pump 112 is selectively in fluid communication with the dosing tank 106 via a pipe 114. The pipe 114 and the pipe 108 may have a common pipe portion 116. The pipe 114 optionally may include a pump isolation valve (not specifically shown). The dosing tank 106 has a dosing isolation valve 118. Opening and closing the dosing tank isolation valve 118 places (or removes) the dosing tank 106 and an inlet 120 of the injection pump 112 in (from) fluid communication. A discharge 122 of the injection pump discharges to the fluid system, such as a wellbore, to which the chemicals are to be injected. As described further below, the injection pump 112 can be a variable speed or constant speed pump. The fill pump, above, may be the same type of pump as the injection pump or a different type of pump as is known in the art.

While shown as having a common pipe portion 116, the pipe 108 from the chemical source tank 102 to the dosing tank 106 and the pipe 116 from the dosing tank 106 to the inlet 120 of the injection pump 112 may be completely separate pipes. The common pipe portion 116, the pipe 108, and the pipe 116 in the present system 100 join at a tee joint 128, which is optional as the pipe between the chemical source tank 102 and the dosing tank 106 may be separate from the pipe between the dosing tank 106 and the injection pump 112.

The dosing tank 106 has a fluid level detector 124. The fluid level detector 124 may be a number of different types of level detectors. In one example, the fluid level detector 124 may be a hydrostatic pressure transducer 124 as shown, in which case the dosing tank 124 is at atmospheric pressure via a vent, a vent plug, or the like. The pressure transducer 124 records the pressure of the column of fluid and converts the pressure to a height measurement. Alternative means for detecting the fluid level include, for example, a radio frequency transducer, a plurality of reed switches, or the like. Generally, the tank isolation valve 110 is closed when the fluid level detector 124 is determining the fluid level in the dosing tank 106. Also, the injection pump 112 is generally not running when the fluid level detector 124 is determining the fluid level in the dosing tank 106. The fluid level detector 124 is shown coupled to the section of the tee joint 128. When the fluid level detector 124 is a pressure transducer, the fluid level detector 124 should be located off the bottom of the dosing tank 106.

The tank isolation valve 110 and the dosing tank isolation valve 118 are typically solenoid valves. The tank and dosing tank isolation valves 110, 118 are operationally coupled to a controller 126, such as a micro-controller 126 as shown. The controller 126 may be any conventional processor. The controller 126 also is operationally coupled to the injection pump 112 and the fluid level detector 124. The controller 126 is configured to control the tank and dosing isolation valves 110, 118 between the open and closed positions as will be described below. The controller 126 is configured to control the operation of the injection pump 112, both on and off as well as speed/duty cycle modulation, as will be explained below.

FIG. 1 shows a system 100 where the elevation of the chemical source tank 102 is above the elevation of the dosing tank 106 to allow for gravity feeding of the dosing tank 106. A transfer pump (optional and not shown) may be placed in the fluid line downstream from the chemical source tank 102 and upstream of the dosing tank 106 to facilitate filling the dosing tank 106. In still other configurations, the discharge 122 may be fitted with a tee joint (like tee joint 128). A line from the tee joint downstream of the injection pump will be in fluid communication with the pump discharge 122. A line from the tee joint downstream of the injection pump will be in fluid communication with the fluid system to which the chemicals are being injected. And, a line from the tee joint downstream of the injection pump will be in fluid communication with the dosing tank 106 such that the injection pump 112 may be used to fill the dosing tank 106. In this instance, at least two additional isolation valves will be used downstream from the injection pump 112. The first isolation valve to isolate the dosing tank 106 fill line when not in use, and the second isolation valve to isolate the fluid system when the first isolation valve is open to fill the dosing tank 106.

FIG. 2 shows a flow chart 200 illustrative of a method for filling the dosing tank 106 with the injection fluid 104 from the chemical source tank 102. As can be appreciated, the flow chart 200 shows a series of discrete steps or processes. The processes may be split into additional steps or combined without departing from the spirit and scope of the technology as defined by the claims. Additionally, the flow chart 200 is illustrative of a method of filling the dosing tank 106 based on the configurations shown in FIG. 1. Other configurations may require different steps or a different order of steps without departing from the spirit and scope of the technology as defined by the claims. First, at step 202, the fluid level of the dosing tank 106 is determined using the fluid level detector 124. Next, it is determined if the fluid level of the reservoir tank 106 is below a minimum level, step 204. If the fluid level is determined to be not below (or equal to in some embodiments) the minimum level, control returns to step 202. If the fluid level is determined to be below (or equal to in some embodiments), the controller 126, in this embodiment, closes the pump isolation valve (if applicable—as shown in FIG. 1, the pump may not have an isolation valve in all embodiments) and opens the tank isolation valve 110 to allow gravity to feed the dosing tank 106, step 206. The fluid level detector 124 monitors the fluid level of the dosing tank 106, step 208. The controller determines whether the fluid level is below (or at) a predetermined fill level, step 210. If the controller determines the fluid level is below (or at) the predetermined fill level, control returns to step 210. If the controller determines the fluid level is not below (or is equal to or above) the predetermined fill level, the controller 126 closes the tank isolation valve 110 to stop filling the dosing tank 106, step 212. In certain embodiments, if a pump is used for the fluid transport between the chemical source tank and the dosing tank, the pump is operated by the controller. Once the dosing tank 106 is filled and the tank isolation valve 110 is closed, the pump isolation valve, in this example, may be opened. Optionally, rather than using the fluid level detector 124 to determine the fill level of the dosing tank 106, the dosing tank 106 may have a switch, such as a reed switch, that provides a signal to the controller that a fill level has been reached.

When not being filled, the dosing tank 106 is used to supply injection fluid to the fluid system. FIG. 3 shows a flow chart 300 illustrative of a method for injecting chemicals at an injection rate using the injection pump 112. As can be appreciated, the flow chart 300 shows a series of discrete steps or processes. The processes may be split into additional steps or combined without departing from the spirit and scope of the technology as defined by the claims. Additionally, the flow chart 300 is illustrative of injecting injection fluid from the dosing tank 106 using the injection pump 112 based on the configurations shown in FIG. 1. Other configurations may require different steps or a different order of steps without departing from the spirit and scope of the technology as defined by the claims. First, at step 302, the injection pump is set at a first speed/duty cycle to inject chemicals at a target dose rate. The target dose rate based on a fluid volume over time, such as, for example, milligrams/minute, liters/minute, grams/hour, or the like depending on the fluid system and the chemical injection requirements for the fluid system. The volume of the dosing tank 106 is determined prior to starting the injection pump (since the flow of injection fluid may cause turbulence and pressure changes that may interfere with accurate determination of volume via fluid level), step 304. Because the dosing tank 106 is a regular shape, such as the aforementioned cylindrical or rectangular shape, volume is a simple mathematical conversion from the fluid pressure determined by the fluid level detector 124 when the fluid level detector 124 is a pressure sensor (or transducer). Next, the injection pump 112 is set to run at the first speed/duty cycle to inject the injection fluid to the fluid system, step 306. In certain embodiments, the dosing tank 106 may have a height dimension significantly greater than the length and width such that small changes in volume product relatively large changes in fluid level to make the fluid level more sensitive to volumetric changes in the dosing tank 106.

The precise fluid level and volumetric changes allow for highly accurate dose over time calculations. The processor can calculate highly accurate dose over a longer period of time, such as, for example, hourly or daily dose rates (which could also be longer time frames). The processor also can calculate extremely accurate instantaneous dose or time calculations by measuring very short time frames of several millisecond to a minute or even 5 to 10 minute intervals. This precision allows for more accurate chemical dosing of the fluid system, such as a hydrocarbon wellbore and, importantly, allows for a much higher degree of certainty regarding on site chemical supplies.

For the configuration of the system using a pressure sensor as the fluid level detector 124, the controller 126 stops the pump, step 308, to allow the fluid level detector 124 to determine the pressure on the pressure sensor without the adverse effects of pump stroking action on the measurement process, step 310. The fluid level is measured periodically and depends in part on the target dose rate and total volume of the dosing tank. The fluid level detector 124 or controller 126 uses the pressure to calculate the height of the fluid and hence the volume as described above, step 312. The controller 126 determines a change in volume over the time from the last volume determination, step 312. Based on the change in volume, the controller 126 determines the actual dose rate, step 314. If the actual dose rate is equal to the target dose rate (or within a predefined tolerance), the controller maintains the first speed/duty cycle of the injection pump, step 314. If the actual dose rate is greater than the target dose rate, the controller 126 changes the speed/duty cycle of the injection pump 112 to a second speed/duty cycle that is slower than the first speed/duty cycle to decrease the actual dose rate, step 318. If the actual dose rate is less than the target dose rate, the controller 126 changes the speed/duty cycle of the injection pump 112 to a third speed/duty cycle that is faster than the first speed/duty cycle to increase the actual dose rate, step 320. Next, the injection pump is re-started to continue to inject chemicals to the fluid system, step 322.

While system 100 can be implemented during an initial installation of a chemical source tank 102, the system 100 also may be retrofitted to existing chemical source tank 102 systems. Retrofitting an existing system may include, among other things, disconnecting the chemical source tank 102 from the inlet of the injection pump 112. The tee joint 128 may be installed on the outlet of the chemical source tank 102. One branch of the tee joint is coupled to the dosing tank 106. If necessary, the tank isolation valve and dosing tank isolation valve are installed. One branch of the tee joint is coupled to the inlet of the injection pump 112 and, if necessary, a pump isolation valve is installed. A fluid level detector 124 is installed, typically at the base of or the fill line of the dosing tank 106. The fluid level detector 124 may be installed at the tee joint 128. A controller 126 is installed. The controller 126 is operationally coupled to the fluid level detector 124, the injection pump 112, and the isolation valves.

Using the dosing tank 106 and the injection pump 112 set to run generally continually has numerous benefits. One benefit is the system 100 obviates the need for expensive flow meters to determine the actual dose rate of the injection fluid.

Also, using the precision dosing system 100 provides a dosing tank 106 with a known shape having an easily calculated volume where a change of fluid height correlates to a change in volume. Thus, the actual dose rate is calculatable and not based on estimates from pump strokes or strap tables. Also, as the dosing tank 106 may be smaller than the chemical source tank 102, and in some cases significantly smaller, the change in level per volume of injected fluid is higher, which increases the resolution and accuracy of the calculation of the actual dose rate. This also allows for more frequent level sampling. Also, while shown with a single fluid level detector 124, which may be used to measure the height (and calculate the volume) of both the chemical source tank and the dosing tank, the system 100 may have multiple fluid level detectors 124, such as one (1) for the chemical source tank and one (1) for the dosing tank. Because the dosing tank is generally smaller, the range of a fluid level detector 124 for the dosing tank 106 may be for a reduced pressure range, which increases the accuracy of the determination.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A chemical injection system comprising,
a chemical source tank having a discharge and an injection fluid stored in the chemical source tank;
a dosing tank selectively in fluid communication with the discharge of the chemical source tank;
a fluid level detector operatively coupled to the dosing tank to determine a fluid level of the dosing tank;
a injection pump having an intake in fluid communication with the dosing tank and a discharge operatively coupled to a fluid system to receive the injection fluid; and
a controller, the controller operatively connected to the fluid level detector and the injection pump, wherein the controller uses a change in the fluid level of the dosing tank to calculate an actual dose rate of the injection fluid to the fluid system and controls a speed/duty cycle of the injection pump such that the actual dose rate approximates a target dose rate.

2. The system of claim 1 wherein the fluid level detector is a pressure sensor.

3. The system of claim 1 wherein the chemical source tank is coupled to the dosing tank with a pipe having at least a tank isolation valve and wherein the controller is operatively connected to the tank isolation valve to selectively place the chemical source tank in fluid communication with the dosing tank.

4. The system of claim 1 wherein the controller stops the injection pump such that the fluid level detector can detect a fluid level in the dosing tank.

5. The system of claim 1 wherein the dosing tank is at an elevation below the chemical source tank such that the chemical source tank gravity fills the dosing tank when the controller opens the tank isolation valve.

6. The system of claim 1 comprising a transfer pump having an intake in fluid communication with the chemical source tank and a discharge in fluid communication with the dosing tank such that operation of the transfer pump draws injection fluid from the chemical source tank to fill the dosing tank.

7. The system of claim 1 wherein the discharge of the injection pump comprises at least a tee joint and a fluid system isolation valve wherein a branch of the tee joint is in fluid communication with the dosing tank such that the injection pump is configured to transfer injection fluid form the chemical source tank to the dosing tank.

* * * * *